US008367229B2

(12) United States Patent
Sasaki

(10) Patent No.: US 8,367,229 B2
(45) Date of Patent: Feb. 5, 2013

(54) PERPENDICULAR MAGNETIC RECORDING MEDIUM AND MAGNETIC RECORDING AND REPRODUCING APPARATUS

(75) Inventor: Yuzo Sasaki, Ichihara (JP)

(73) Assignee: Showa Denko K.K., Tokyo (JP)

( * ) Notice: Subject to any disclaimer, the term of this patent is extended or adjusted under 35 U.S.C. 154(b) by 305 days.

(21) Appl. No.: 12/678,086

(22) PCT Filed: Sep. 30, 2008

(86) PCT No.: PCT/JP2008/067744
§ 371 (c)(1),
(2), (4) Date: Jun. 14, 2010

(87) PCT Pub. No.: WO2009/044733
PCT Pub. Date: Apr. 9, 2009

(65) Prior Publication Data
US 2010/0246060 A1    Sep. 30, 2010

(30) Foreign Application Priority Data
Oct. 3, 2007    (JP) ................................. 2007-259306

(51) Int. Cl.
*G11B 5/66* (2006.01)
(52) U.S. Cl. .................... 428/829; 428/828.1; 428/836.2
(58) Field of Classification Search .......................... None
See application file for complete search history.

(56) References Cited

U.S. PATENT DOCUMENTS

| 6,830,824 | B2 * | 12/2004 | Kikitsu et al. ............. 428/828.1 |
| 7,537,845 | B2 * | 5/2009 | Lee et al. ....................... 428/829 |
| 7,695,832 | B2 | 4/2010 | Oikawa |
| 7,976,965 | B2 * | 7/2011 | Shimizu et al. ............. 428/828.1 |
| 8,034,470 | B2 * | 10/2011 | Oikawa et al. ................ 428/829 |
| 2002/0012816 | A1 * | 1/2002 | Shimizu et al. ......... 428/694 TM |
| 2003/0219630 | A1 * | 11/2003 | Moriwaki et al. ......... 428/694 R |
| 2006/0177703 | A1 * | 8/2006 | Takenoiri et al. ............. 428/829 |
| 2006/0204791 | A1 * | 9/2006 | Sakawaki et al. .......... 428/828.1 |
| 2009/0231755 | A1 | 9/2009 | Takahashi et al. |

FOREIGN PATENT DOCUMENTS

| CN | 1870145 A | 11/2006 |
| JP | 2006-048900 A | 2/2006 |
| JP | 2006-351058 A | 12/2006 |
| JP | 2008-090913 A | 4/2008 |

OTHER PUBLICATIONS

R.H. Victoria, et al., "Composite Media for Perpendicular Magnetic Recording," IEEE Transactions on Magnetics, Feb. 2005, pp. 537-542, vol. 41, No. 2. R.H. Victora, et al., "Composite Media for Perpendicular Magnetic Recording," IEEE Transactions on Magnetics, pp. 537-542, Feb. 2005, vol. 41, No. 2.

* cited by examiner

*Primary Examiner* — Kevin Bernatz
(74) *Attorney, Agent, or Firm* — Sughrue Mion, PLLC

(57) ABSTRACT

The present invention relates to a perpendicular magnetic recording medium including a nonmagnetic substrate, and at least a soft magnetic layer (SUL), an alignment control layer, a magnetic recording layer and a protective layer formed on the nonmagnetic substrate, wherein the magnetic recording layer is constituted of two or more layers and includes a first magnetic recording layer and a second magnetic recording layer from the nonmagnetic substrate side and, regarding magnetocrystalline anisotropic energy $K_u$ of each magnetic recording layer, the first magnetic recording layer has $4 \times 10^6$ erg/cc or higher and the second magnetic recording layer has $2 \times 10^6$ erg/cc or lower, wherein the first magnetic recording layer is constituted of CoCrPtRu magnetic alloy crystal grains and grain boundaries made of an oxide and the area of grain boundaries is 30% or more based on the entire area in a planar TEM observation of the first magnetic recording layer. The present invention also relates to a magnetic recording and reproducing apparatus using the perpendicular magnetic recording medium.

9 Claims, 1 Drawing Sheet

PERPENDICULAR MAGNETIC RECORDING MEDIUM AND MAGNETIC RECORDING AND REPRODUCING APPARATUS

TECHNICAL FIELD

The present invention relates to a perpendicular magnetic recording medium, and a magnetic recording and reproducing apparatus using the perpendicular magnetic recording medium.

BACKGROUND ART

In recent years, the range of applications for magnetic recording apparatuses such as magnetic disk drives, flexible disk drives and magnetic tape drives has been markedly increased and the importance of such apparatuses has also increased. Also, the recording density of the magnetic recording media used in such apparatuses is being largely increased. In particular, a steeper increase in areal recording density followed the introduction of an MR head and a PRML technique in a hard disk drive (HDD). Since the introduction of a GMR head and a TuMR head in recent years, the recording density has been increasing at a pace of about 100% per year.

As a magnetic recording system of HDD, a so-called perpendicular magnetic recording system has recently extended its applications rapidly as a technique to replace a conventional longitudinal magnetic recording system. In the perpendicular magnetic recording system, crystal grains of a recording layer for recording information has an easy axis of magnetization in a direction perpendicular to a substrate. The easy axis of magnetization is an axis in the direction of which magnetization easily points. In the case of a conventionally used Co-based alloy, the easy axis of magnetization is an axis (c-axis) parallel to the normal line of a (002) crystal plane of a hexagonal closest-packed structure of Co. Therefore, an influence of a demagnetizing field between recording bits is small even when the recording density increases, and the magnetization is magnetostatically stable.

In ordinary cases, a perpendicular magnetic recording medium has a seed layer, an intermediate layer, a magnetic recording layer and an overcoat formed in this order on a nonmagnetic substrate. Also, in many cases, a lubricating layer is applied on the surface after film forming of the overcoat. Also, a magnetic film called a soft-magnetic under layer is ordinarily provided under the seed layer. The seed layer and the intermediate layer are formed for the purpose of further improving the characteristics of the magnetic recording layer. Specifically, they have a function of aligning crystals in the magnetic recording layer and also of controlling the shape of magnetic grains.

In order to increase the recording density of the perpendicular magnetic recording medium, it is necessary to realize low noise while maintaining thermal stability. Two methods are ordinarily used so as to reduce noise. One method is a method of decreasing the magnetic interaction between magnetic crystal grains in the intra-film plane direction by magnetically separating and isolating magnetic crystal grains of the recording layer. Another method is a method of decreasing the grain size of magnetic crystal grains. The method includes, for example, a method of adding $SiO_2$ to the recording layer to form a perpendicular magnetic recording layer having a so-called granular structure in which magnetic crystal grains are surrounded with the grain boundary region containing a large amount of $SiO_2$. However, when the noise is reduced by such a method, it is necessary to increase the perpendicular magnetic anisotropy ($K_u$) of magnetic crystal grains so as to ensure thermal stability. However, when the magnetic anisotropy energy is increased, $H_c$ and $H_{c0}$ increase and writing at the recording head becomes insufficient, resulting in a problem such as deterioration of reproducing characteristics.

As a method for solving the problem, a so-called composite media has been proposed in which an auxiliary layer made of soft magnetic grains is provided on or under the perpendicular magnetic recording layer (main recording layer) having the above granular structure (for example, Non-Patent Document 1, Patent Document 1). Because of exchange coupling between a hard magnetic film as the main recording layer and a soft magnetic film as the auxiliary layer, it becomes possible to invert at a lower applied magnetic field than that of a conventional perpendicular magnetic recording medium if the auxiliary layer portion initiates magnetization inversion upon application of the magnetic field from the head first. It is also possible to control exchange coupling between the main recording layer and the auxiliary layer thereby designing a perpendicular magnetic recording medium having optimum characteristics by providing a nonmagnetic film between the main recording layer and the auxiliary layer.

However, when the main recording layer also has an exchange interaction in the in-plane direction of the substrate, the exchange interaction between the main recording layer and the auxiliary layer decreases, and thus only the auxiliary layer causes magnetization inversion first and the effect of reducing the reversing magnetic field decreases. Furthermore, the magnetic moment inverted alone of the auxiliary layer becomes a noise component and recording and reproducing characteristics deteriorate.

Non-Patent Document 1:
IEEE Transaction on Magnetics, Vol. 41, pp. 537
Patent Document 1:
Japanese Patent Application No. 2005-172601

DISCLOSURE OF THE INVENTION

Problems to be Solved by the Invention

Under these circumstances, the present invention has been made and an object thereof is to provide a perpendicular magnetic recording medium which has both satisfactory thermal stability, and recording and reproducing characteristics, and also enables high recording density by decreasing exchange coupling in the in-plane direction of the substrate of a main recording layer, and a magnetic recording apparatus using the same.

Means for Solving the Problems

In order to achieve the above object, the present invention provides the aspects shown below.

(1) A perpendicular magnetic recording medium including a nonmagnetic substrate, and at least a soft magnetic layer (SUL), an alignment control layer, a magnetic recording layer and a protective layer formed on the nonmagnetic substrate; wherein the magnetic recording layer is constituted of two or more layers and includes a first magnetic recording layer and a second magnetic recording layer from the nonmagnetic substrate side and, regarding magneto crystalline anisotropic energy ($K_u$) of each magnetic recording layer, the first magnetic recording layer has $4 \times 10^6$ (erg/cc) or higher and the second magnetic recording layer has $2 \times 10^6$ (erg/cc) or lower, wherein the first magnetic recording layer is constituted of CoCrPtRu magnetic alloy crystal grains and grain boundaries made of an oxide and the area of grain boundaries is 30% or more based on the entire area in a planar TEM observation of the first magnetic recording layer.

(2) The perpendicular magnetic recording medium according to (1), which includes an exchange coupling control layer between the first magnetic recording layer and the second magnetic recording layer.

(3) The perpendicular magnetic recording medium according to (1) or (2), wherein the first magnetic recording layer contains 3 to 8 atomic % of at least one element selected from the group consisting of Al, V, Ti, Mo, Nb, Zr, W, Ta, Hf, Re, Gd, Tb, Sm, Ce, Nd and Pr in CoCrPtRu magnetic alloy crystal grains, and also contains at least one element selected from the group consisting of Al, B, Bi, Ca, Cr, Fe, Hf, Mg, Mo, Nb, Ru, Si, Ta, Ti, W and Zr in grain boundaries.

(4) A magnetic recording and reproducing apparatus including a magnetic recording medium, and a magnetic head for recording information on the magnetic recording medium and reproducing information from the magnetic recording medium, wherein the magnetic recording medium is the perpendicular magnetic recording medium according to any one of (1) to (3).

Effects of the Invention

According to the present invention, it is possible to provide a perpendicular magnetic recording medium which has excellent thermal stability, and also has excellent high recording density characteristics.

DESCRIPTION OF REFERENCE NUMERALS

| | |
|---|---|
| 1: | Nonmagnetic substrate |
| 2: | Soft magnetic layer (SUL) |
| 3: | Seed layer |
| 4: | Intermediate layer |
| 5-1: | First magnetic recording layer |
| 5-2: | Exchange coupling control layer |
| 5-3: | Second magnetic recording layer |
| 6: | Protective layer |
| 100: | Magnetic recording medium |
| 101: | Medium drive unit |
| 102: | Magnetic head |
| 103: | Head drive unit |
| 104: | Recording and reproduction signal processing system |

BEST MODE FOR CARRYING OUT THE INVENTION

Figure 1:
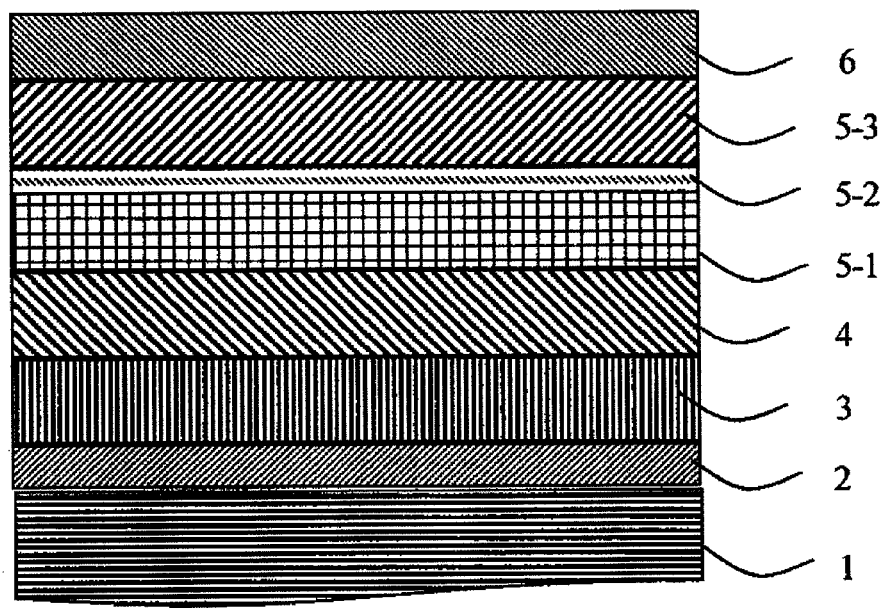
FIG. 1 is a diagram showing a cross-sectional structure of a perpendicular magnetic recording medium according to the present invention.

FIG. 1 is a cross-sectional view showing an example of a perpendicular magnetic recording medium according to the present invention.

The perpendicular magnetic recording medium 100 of the present invention has a structure, for example, wherein on a nonmagnetic substrate 1, at least a soft magnetic layer (SUL) 2, a seed layer 3 and an intermediate layer 4 constituting an alignment control layer for controlling the alignment of a film immediately above, a perpendicular magnetic layer 5, and a protective layer 6 are stacked in this order. The perpendicular magnetic recording layer 5 is constituted of a first recording layer 5-1 as a main recording layer, an exchange coupling control layer 5-2 and a second magnetic recording layer 5-3 as an auxiliary layer.

As the nonmagnetic substrate used in the magnetic recording medium of the present invention, any nonmagnetic substrate such as an Al alloy substrate containing Al as a main component, for example, an Al—Mg alloy, or a substrate made of ordinary soda glass, aluminosilicate glass, amorphous glass, silicon, titanium, ceramic, sapphire, quartz, or any of various resins, can be used. Among these substrates, an Al alloy substrate or a glass substrate made of crystallized glass or amorphous glass etc. is often used. In the case of a glass substrate, a mirror-polished substrate and a low-Ra substrate of Ra<1 (Å) are preferable. The substrate may have a texture if it is insignificant.

In ordinary cases of a process of manufacturing a magnetic disk, cleaning and drying of a substrate are first performed. Also in the present invention, in terms of ensuring adhesion of each layer, it is desirable to perform cleaning and drying before forming of the layer. Cleaning includes cleaning by etching (inverse sputtering) as well as cleaning with water. The substrate size is not particularly specified.

The soft magnetic layer (SUL) is provided in many perpendicular magnetic recording media. The soft magnetic layer (SUL) has the function of introducing a recording magnetic field from a head to efficiently apply a perpendicular component of the recording magnetic field to the magnetic recording layer at the time of recording a signal on the medium. As the material of the soft magnetic layer (SUL), a material having soft magnetic characteristics, such as a FeCo-based alloy, a CoZrNb-based alloy or a CoTaZr-based alloy can be used. It is particularly preferable that the soft magnetic layer is of an amorphous structure, because taking an amorphous structure is effective, in preventing an increase in surface roughness (Ra) and enables a reduction in the flying height of the head and further increasing the recording density. Not only the single soft magnetic layer but also a combination of two soft magnetic layers between which an extremely thin nonmagnetic thin film of Ru is interposed for an antiferromagnetic coupling is preferable. The total thickness of the soft magnetic layer (SUL) is from about 20 to 120 nm. However, it is appropriately determined according to the balance between the recording and reproducing characteristics, and the overwrite characteristics.

The alignment control layer is constituted of a plurality of layers and includes so-called seed and intermediate layers from the substrate side. The seed layer has the function of controlling the grain size and crystal alignment of the intermediate layer and the magnetic recording layer. The material of the seed layer is preferably Ta, Ni having a (111) plane-aligned face-centered cubic crystalline structure, or a Ni alloy such as Ni—Nb, Ni—Ta, Ni—V or Ni—W.

When the soft magnetic layer (SUL) has an amorphous structure, Ra may increase according to the material and film forming conditions. Therefore, Ra is decreased by forming a nonmagnetic amorphous layer between the soft magnetic layer (SUL) and the seed layer, thus making it possible to improve the alignment of the magnetic recording layer.

Similar to the magnetic recording layer, the material of the intermediate layer is preferably a material having a hexagonal closest-packed structure, such as Ru, Re, or an alloy thereof. Since the intermediate layer has the function of controlling the alignment of the magnetic recording layer, the material for controlling the alignment of the magnetic recording layer can be used even if it does not have a hexagonal closest-packed structure. The total thickness of the alignment control layer is preferably 5 (nm) or more and 20 (nm) or less according to the balance between the recording and reproducing characteristics, and the overwrite characteristics. When the magnetic recording layer having a granular structure is used as the magnetic recording layer, segregation to the crystal grain boundaries of the nonmagnetic oxide or nitride is promoted by increasing the surface roughness of the intermediate layer. Therefore, the gas pressure at the time of film forming of the intermediate layer is preferably 3 (Pa) or more, and more preferably 10 (Pa) or more.

The perpendicular magnetic recording layer in the present invention is a main recording layer and is constituted of a first magnetic recording layer having a high $K_u$ value, an exchange coupling control layer for increasing exchange coupling between the first magnetic recording layer and a second magnetic recording layer, and a second magnetic recording layer which is an auxiliary layer and has a low $K_u$ value. $K_u$ of the first magnetic recording layer is preferably $4\times10^6$ (erg/cc) or higher and $K_u$ of the second magnetic recording layer is preferably $2\times10^6$ (erg/cc) or lower.

In the constitution of the present invention, ferromagnetic exchange coupling between the first magnetic recording layer and the second magnetic recording layer causes magnetization inversion at a lower external magnetic field than that when the second magnetic recording layer does not exist. When exchange coupling between the first and second magnetic recording layers is moderately strong, the second magnetic recording layer having a low $K_u$ value initiates magnetization inversion first, and the first magnetic recording layer also causes magnetization inversion by exchange coupling between the first and second magnetic recording layers so as to be drawn to the second magnetic recording layer (magnetization inversion mode called incoherent rotation). In such a case, since the magnetic moment of the first magnetic recording layer gradually inverts, thermal stability of the entire medium is maintained. Furthermore, since the overwrite characteristics are improved, the recording and reproducing characteristics are also improved. When exchange coupling between the first and second magnetic recording is stronger than a proper range, the magnetic moment of the first magnetic recording layer and that of the second magnetic recording layer simultaneously inverts (magnetization inversion mode called coherent rotation) and thus the $K_u$ value of two layers is simply averaged and the thermal stability deteriorates. To the contrary, when exchange coupling is too weak, only the second magnetic recording layer causes magnetization inversion first and the effect of reducing the reversing magnetic field of the first magnetic recording layer decreases. Furthermore, the magnetic moment inverted alone of the second magnetic recording layer becomes a noise component and recording and reproducing characteristics deteriorate.

In the present invention, $K_u$ of the first magnetic recording layer is preferably adjusted to be within a range from $4\times10^6$ to $7\times10^6$ (erg/cc), and $K_u$ of the second magnetic recording layer is preferably adjusted to be within a range from $0.5\times10^6$ to $2\times10^6$ (erg/cc).

Even if exchange coupling between the first and second magnetic recording layers is proper, when a large influence of exchange coupling in the in-plane direction of the substrate of the first magnetic recording layer is exerted, exchange coupling between the first and second magnetic recording layers relatively decreases and incoherent magnetization inversion is not achieved. In order to suppress an exchange interaction in the in-plane direction of the first magnetic recording layer, at least one layer of the first magnetic recording layer in the present invention has a granular structure constituted of ferromagnetic CoCrPtRu magnetic alloy crystal grains and grain boundaries made of nonmagnetic oxide. In planar TEM images of the first magnetic recording layer, the area of grain boundaries is preferably 30% or more. As the magnetic crystal material of the first magnetic recording layer, those containing Co, Cr, Pt, and Ru as essential components (CoCrPtRu magnetic alloy essential component) and also containing an oxide for formation of a granular structure added therein are preferably used. It is possible to use, as the oxide, at least one element selected from Al, B, Bi, Ca, Cr, Fe, Hf, Mg, Mo, Nb, Ru, Si, Ta, Ti, W and Zr. It is also possible to add an oxide of two or more elements.

The area of grain boundaries of the first magnetic recording layer of the present invention is more preferably adjusted to be within a range from 30% to 40%, and most preferably from 32% to 35%.

Exchange coupling in the in-plane direction can be suppressed by increasing the amount of the oxide of a target to be sputtered. However, since the oxide is decomposed into oxygen and a metal element when the oxide is sputtered, Co of a CoCrPtRu alloy may be oxidized by oxygen generated by decomposition, resulting in a decrease of the magnetic moment (signal output). It is effective to bond oxygen in place of Co by adding other elements so as to suppress oxidation of Co. In the first magnetic recording layer of the present invention, the transition metal element is preferably added so that CoCrPtRu magnetic alloy crystal grains contain 3 to 8 (atomic %) of at least one transition metal element selected from Al, V, Ti, Mo, Nb, Zr, W, Ta, Hf and Re. It is also possible to suppress oxidation of Co by adding a rare earth element in place of the transition metal element so that CoCrPtRu magnetic alloy crystal grains contain 3 to 8 (atomic %) of at least one rare earth element selected from Gd, Tb, Sm, Ce, Nd and Pr. In terms of being capable of effectively suppressing oxidation of Co, it is more preferable to add the element so that CoCrPtRu magnetic alloy crystal grains contain 3 to 8 (atomic %) of at least one element selected from Ti, Mo, Nb and Tb.

The formulation of the first magnetic recording layer can be adjusted so that $K_u$ of the first magnetic recording layer is $4\times10^6$ (erg/cc) or higher and also the area of grain boundaries of the first magnetic recording layer is 30% or more. It is also possible to adjust the component ratio (mol %) of a CoCrPtRu magnetic alloy (total of Co, Cr, Pt and Ru as essential components and an element to be added so as to suppress oxidation of Co) and an oxide constituting grain boundaries so that $K_u$ of the first magnetic recording layer is $4\times10^6$ (erg/cc) or higher and also the area of grain boundaries of the first magnetic recording layer is 30% or more.

The average grain size of magnetic crystal grains forming the first magnetic recording layer is preferably 3 (nm) or more and 10 (nm) or less. The average grain boundary width is preferably 1 (nm) or more and 2 (nm) or less. The average crystal grain size and the average grain boundary width as well as the area of grain boundaries can be calculated using planar TEM observation images.

The first magnetic recording layer may have a multilayered structure constituted of two or more layers made of these materials. In that case, at least one layer has the above granular structure.

As the material of the exchange coupling control layer, a nonmagnetic material can be used. The material is appropriately determined, but is usually an element having a hexagonal closest-packed structure, such as Ru or Re, or an alloy. The film thickness of the exchange coupling control layer is preferably within a range where exchange coupling between the first magnetic recording layer and the second magnetic recording layer is ferromagnetic coupling. In the present invention, the film thickness of the exchange coupling control layer is preferably within a range of 0.3 to 2.5 nm.

The protective layer is a layer for protecting the medium from damage caused by contact with a head. A carbon film or a $SiO_2$ film etc. is used as the protective layer, and the carbon film is ordinarily used. For forming of the film, a sputtering or plasma CVD method etc. is used, and the plasma CVD method has been ordinarily used in recent years. A magnetron plasma CVD can also be used. The film thickness is from about 1 (nm) to 10 (nm), preferably from about 2 (nm) to 6 (nm), and more preferably from 2 (nm) to 4 (nm).

Figure 2:
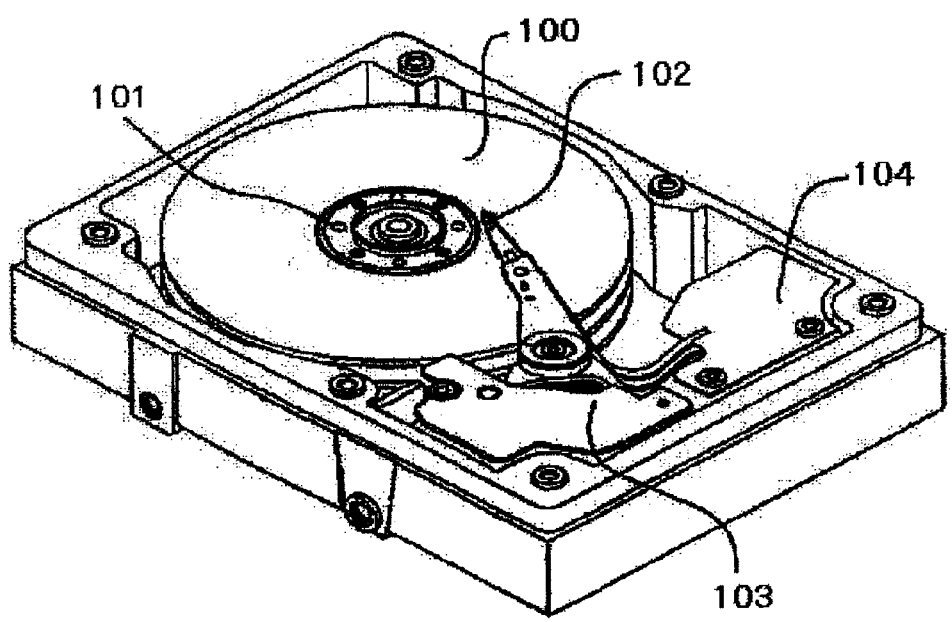
FIG. 2 is a diagram showing a structure of a perpendicular magnetic recording and reproducing apparatus according to the present invention.

FIG. 2 shows an example of a perpendicular magnetic recording and reproducing apparatus using the above perpendicular magnetic recording medium. The perpendicular magnetic recording and reproducing apparatus shown in FIG. 2 includes the magnetic recording medium 100 having the structure shown in FIG. 1, a medium drive unit 101 which drives and rotates the magnetic recording medium 100, a magnetic head 102 which records information on the magnetic recording medium 100 or reproduces information from the magnetic recording medium 100, a head drive unit 103 which moves the magnetic head 102 relative to the magnetic recording medium 100, and a recording and reproduction signal processing system 104.

The recording and reproduction signal processing system 104 can process data supplied from the outside to obtain a recording signal, supply the recording signal to the magnetic head 102, and process a reproduction signal from the magnetic head 102 to send data to the outside.

As the magnetic head 102 used in the magnetic recording and reproducing apparatus of the present invention, any of magnetic heads suitable for higher-density magnetic recording, those having a GMR element using a giant magneto-resistive (GMR) effect and a TuMR element using a tunneling effect can be used.

EXAMPLES

The present invention will be explained below by way of Examples.

Example 1, Comparative Example 1

A vacuum chamber in which a glass substrate for HD was set was evacuated in advance to become $1.0 \times 10^{-5}$ (Pa) or less.

Subsequently, as a soft magnetic layer (SUL), a Co10Ta5Zr film having a thickness of 20 (nm), a Ru film having a thickness of 0.6 (nm) and a Co10Ta5Zr film having a thickness of 20 (nm) were formed at a gas pressure of 0.6 (Pa) in an Ar atmosphere. Subsequently, as a seed layer, a Ni10W film having a thickness of 8 (nm) was formed at 0.6 (Pa). As an intermediate layer, a Ru film having a thickness of 10 (nm) was formed at a gas pressure of 0.6 (Pa) and a Ru film having a thickness of 10 (nm) was formed at 10 (Pa), in an Ar atmosphere.

As a first magnetic recording layer, a 88(Co5Cr20Pt8Ru8Ti)-12($SiO_2$) film, a 88(Co5Cr20Pt8Ru8Mo)-12($SiO_2$) film, a 88(Co7Cr20Pt8Ru5Nd)-12($SiO_2$) film and a 88(Co7Cr20Pt8Ru5Tb)-12($SiO_2$) (mol %), each having a thickness of 12 (nm), were formed at 5 (Pa) in an Ar atmosphere. As an exchange coupling control layer, a Ru film having a film thickness of 0.6 (nm) was formed at a gas pressure of 0.6 (Pa) (Examples 1-1 to 1-4). Subsequently, as a second magnetic recording layer, a Co10Cr5Pt5B film having a thickness of 7 (nm) was formed at a gas pressure 0.6 (Pa) in an Ar atmosphere. As a first magnetic recording layer of Comparative Examples, a 92(Co5Cr20Pt8Ru8Ti)-8($SiO_2$) film, a 92(Co5Cr20Pt8Ru8Mo)-8($SiO_2$) film, a 92(Co7Cr20Pt8Ru5Nd)-8($SiO_2$) film, a 92(Co7Cr20Pt8Ru5Tb)-8($SiO_2$) film and a 88(Co5Cr20Pt8Ru)-12($SiO_2$) film (mol %), each having a film thickness of 12 (nm), were formed at 5 (Pa) in an Ar atmosphere, and then an exchange coupling control layer and a second magnetic recording layer were formed (Comparative Examples 1-1 to 1-5). Furthermore, as a protective layer, a C film was formed to obtain a perpendicular magnetic recording medium.

To the resultant perpendicular magnetic recording media (Examples 1-1 to 1-4 and Comparative Examples 1-1 to 1-5), a lubricant was applied, and the recording and reproducing characteristics were evaluated by using a Read Write Analyzer 1632 and a Spinstand S1701 MP manufactured by Guzik, USA. Subsequently, magnetostatic characteristics were evaluated by a Kerr measuring apparatus. Also, a granular structure of the first magnetic recording layer was observed from planar TEM images.

With respect to Examples and Comparative Examples, the measurement results of high signal-to-noise ratio (SNR), overwrite (OW), proportion of oxide grain boundaries of the first magnetic recording layer, coercive force (Hc) and nucleation field (—Hn) are shown in Table 1.

As is apparent from Table 1, in Examples, Hn is about 2,000 (Oe) (1 Oe is about 79 A/m) and thermal stability is ensured, and also SNR shows a high value. Usually, since an exchange interaction in the in-plane direction of the substrate decreases when the amount of the oxide increases, Hn decreases. The reason why Hn of Comparative Examples 1-1 to 1-5 is lower than that of Examples 1-1 to 1-4 regardless of a small amount of the oxide, is considered that exchange coupling between the first and second magnetic recording layer relatively decreases as a result of exchange coupling in the in-plane direction of the first magnetic recording layer, and thus the second magnetic recording layer alone causes magnetization inversion.

TABLE 1

| Samples | First magnetic recording layer (mol %) | Ku (erg/cc) | Oxide grain boundaries | Second magnetic recording layer | SNR (dB) | OW (dB) | Hc (Oe) | −Hn (Oe) |
|---|---|---|---|---|---|---|---|---|
| Example 1-1 | 88(Co5Cr20Pt8Ru8Ti)-12($SiO_2$) | $5.3 \times 10^6$ | 34% | Co10Cr5Pt5B (Atomic %) | 16.6 | 40.0 | 4239 | −2006 |
| Example 1-2 | 88(Co5Cr20Pt8Ru8Mo)-12($SiO_2$) | $5.1 \times 10^6$ | 33% | Ku = $1.3 \times 10^6$ (erg/cc) | 16.8 | 41.2 | 4156 | −1974 |
| Example 1-3 | 88(Co7Cr20Pt8Ru5Nd)-12($SiO_2$) | $5.8 \times 10^6$ | 32% |  | 16.5 | 39.6 | 4287 | −2126 |
| Example 1-4 | 88(Co7Cr20Pt8Ru5Tb)-12($SiO_2$) | $5.8 \times 10^6$ | 33% |  | 16.8 | 40.4 | 4188 | −1994 |

TABLE 1-continued

| Samples | First magnetic recording layer (mol %) | Ku (erg/cc) | Oxide grain boundaries | Second magnetic recording layer | SNR (dB) | OW (dB) | Hc (Oe) | −Hn (Oe) |
|---|---|---|---|---|---|---|---|---|
| Comparative Example 1-1 | 92(Co5Cr20Pt8Ru8Ti)-8(SiO$_2$) | 6.6 × 10$^6$ | 25% | | 14.2 | 45.4 | 3782 | −1452 |
| Comparative Example 1-2 | 92(Co5Cr20Pt8Ru8Mo)-8(SiO$_2$) | 6.5 × 10$^6$ | 23% | | 14.5 | 46.2 | 3732 | −1529 |
| Comparative Example 1-3 | 92(Co7Cr20Pt8Ru5Nd)-8(SiO$_2$) | 6.6 × 10$^6$ | 23% | | 14.3 | 45.1 | 3873 | −1534 |
| Comparative Example 1-4 | 92(Co7Cr20Pt8Ru5Tb)-8(SiO$_2$) | 6.7 × 10$^6$ | 24% | | 14.3 | 44.9 | 3821 | −1551 |
| Comparative Example 1-5 | 88(Co7Cr20Pt8Ru)-12(SiO$_2$) | 6.4 × 10$^6$ | 28% | | 15.2 | 45.2 | 3735 | −1732 |

INDUSTRIAL APPLICABILITY

The perpendicular magnetic recording medium and the magnetic recording and reproducing apparatus using the magnetic recording medium of the present invention can be used in the field of an information technique, and has high industrial applicability.

The invention claimed is:

1. A perpendicular magnetic recording medium comprising a nonmagnetic substrate, and at least a soft magnetic layer (SUL), an alignment control layer, a magnetic recording layer and a protective layer formed on the nonmagnetic substrate;
    wherein the magnetic recording layer is constituted of two or more layers
    and includes a first magnetic recording layer and a second magnetic recording layer from the nonmagnetic substrate side and,
    regarding magnetocrystalline anisotropic energy Ku of each magnetic recording layer,
    the first magnetic recording layer has 4×10$^6$ erg/cc or higher
    and the second magnetic recording layer has 2×10$^6$ erg/cc or lower,
    wherein the first magnetic recording layer is constituted of CoCrPtRu magnetic alloy crystal grains and grain boundaries made of an oxide, wherein the first magnetic recording layer contains 3 to 8 atomic % of at least one element selected from the group consisting of Al, V, Ti, Mo, Nb, Zr, W, Ta, Hf, Re, Gd, Tb, Sm, Ce, Nd and Pr in CoCrPtRu magnetic alloy crystal grains,
    and the area of grain boundaries is 30% to 35% based on the entire area in a planar TEM observation of the first magnetic recording layer.

2. The perpendicular magnetic recording medium according to claim 1, which includes an exchange coupling control layer between the first magnetic recording layer and the second magnetic recording layer.

3. The perpendicular magnetic recording medium according to claim 1,
    wherein the first magnetic recording layer
    also contains at least one element selected from the group consisting of Al, B, Bi, Ca, Cr, Fe, Hf, Mg, Mo, Nb, Ru, Si, Ta, Ti, W and Zr in grain boundaries.

4. A magnetic recording and reproducing apparatus comprising a magnetic recording medium, and a magnetic head for recording information on the magnetic recording medium and reproducing information from the magnetic recording medium, wherein the magnetic recording medium is the perpendicular magnetic recording medium according to claim 1.

5. The perpendicular magnetic recording medium according to claim 1, wherein the area of grain boundaries is 32% to 35% based on the entire area in a planar TEM observation of the first magnetic recording layer.

6. The perpendicular magnetic recording medium according to claim 5, wherein the first magnetic recording layer has a magnetocrystalline anisotropic energy Ku of 4×10$^6$ erg/cc to 5.8×10$^6$ erg/cc.

7. The perpendicular magnetic recording medium according to claim 1, wherein the area of grain boundaries is 32% to 34% based on the entire area in a planar TEM observation of the first magnetic recording layer.

8. The perpendicular magnetic recording medium according to claim 7, wherein the first magnetic recording layer has a magnetocrystalline anisotropic energy Ku of 4×10$^6$ erg/cc to 5.8×10$^6$ erg/cc.

9. The perpendicular magnetic recording medium according to claim 1, wherein the first magnetic recording layer has a magnetocrystalline anisotropic energy Ku of 4×10$^6$ erg/cc to 5.8×10$^6$ erg/cc.

* * * * *